United States Patent [19]

Shinmoto et al.

[11] Patent Number: 4,787,705
[45] Date of Patent: Nov. 29, 1988

[54] COMPOSITE OPTICAL FIBER AND POWER CABLE

[75] Inventors: Takashi Shinmoto, Nagareyama; Masato Koike, Tokyo, both of Japan

[73] Assignee: Fujikura Ltd., Tokyo, Japan

[21] Appl. No.: 11,798

[22] Filed: Feb. 6, 1987

[30] Foreign Application Priority Data

Sep. 5, 1986 [JP] Japan .................. 61-208884

[51] Int. Cl.⁴ .............................................. G02B 6/44
[52] U.S. Cl. ..................................................... 350/96.23
[58] Field of Search ...................................... 350/96.23

[56] References Cited

U.S. PATENT DOCUMENTS

| | | | |
|---|---|---|---|
| 4,078,853 | 3/1975 | Kempf et al. | 350/96.23 |
| 4,456,331 | 6/1984 | Whitehead et al. | 350/96.23 |
| 4,467,138 | 8/1984 | Brorein | 350/96.23 X |

FOREIGN PATENT DOCUMENTS

| | | | |
|---|---|---|---|
| 56-32314 | 3/1981 | Japan . | |
| 1583276 | 1/1981 | United Kingdom | 350/96.23 |

Primary Examiner—John Lee
Attorney, Agent, or Firm—Sprung Horn Kramer & Woods

[57] ABSTRACT

A composite power cable includes an elongated cable core having an electrical conductor and a shield layer of a semiconductive material. The cable includes an outer sheath of a first thermoplastic resin encompassing the cable core. A plurality of concentric neutral wires are embedded in the outer sheath and helically wound around the cable core. At least one elongated flexible optical fiber unit is embedded in the outer sheath and helically wound around the cable core so as to extend along the neutral wires. The fiber unit includes an elongated body of a second thermoplastic resin extending longitudinally thereof, at least one flexible tube embedded in the body to extend longitudinally thereof, at least one optical fiber loosely received in the tube to extend longitudinally thereof and at least one elongated tension member embedded in the body to extend longitudinally thereof. The second thermoplastic resin is different from the first thermoplastic resin and has non-adhesive property with respect to the first thermoplastic resin.

1 Claim, 1 Drawing Sheet

COMPOSITE OPTICAL FIBER AND POWER CABLE

BACKGROUND OF THE INVENTION

1. Field of the Invention

The present invention relates to a high-voltage composite power cable having an optical fiber provided therein.

2. Prior Art

One conventional composite power cable as shown in FIG. 1 is disclosed in Japanese Utility Model Application Laid-Open No. 56-32314. The power cable includes an electrical conductor 100, an inner layer 102 of a semiconductive material applied around the conductor 100, an insulation layer 104 applied around the inner layer 102 and an outer layer 106 of a semiconductive material applied around the insulation layer 104. The cable further includes a plurality of electrostatic-shielding metal wires 108 and a metal tube 110 each wound around the outer semiconductive layer 106, an optical fiber 112 housed in the tube 110 and a corrosion protective sheath 114 applied around the outer semiconductive layer 106 to encompass the metal wires 108 and the tube 110.

In such a conventional composite cable, however, since the metal tube 110 has little flexibility, it might be damaged when peeling it from the cable to connect the optical fiber 112 to a device or the like. In addition, even after the installation of the cable, the metal tube 110 might be torn off due to the unexpected movement of the cable, so that the optical fiber 112 received in the tube 110 has been susceptible to damage.

SUMMARY OF THE INVENTION

It is therefore an object of the present invention to provide a composite power cable which permits an optical fiber to be easily separated from the cable without damaging it during connecting work of the cable, the optical fiber being not subjected to damage even if the installed cable moves.

According to the present invention, there is provided a composite power cable comprising an elongated cable core having an electrical conductor extending longitudinally thereof and a shield layer of a semiconductive material provided around the conductor, an outer sheath of a first thermoplastic resin encompassing the cable core, a plurality of concentric neutral wires embedded in the outer sheath and helically wound around the cable core, and at least one elongated flexible optical fiber unit embedded in the outer sheath and wound around the cable core so as to extend along the neutral wires, the optical fiber unit comprising an elongated body of a second thermoplastic resin extending longitudinally thereof, at least one flexible tube embedded in the body to extend longitudinally of the body, at least one optical fiber loosely received in the tube to extend longitudinally of the tube and at least one elongated tension member embedded in the body to extend longitudinally of the body, the second thermoplastic resin being different from the first thermoplastic resin and having non-adhesive property with respect to the first thermoplastic resin.

DESCRIPTION OF PREFERRED EMBODIMENT OF THE INVENTION

Figure 1:
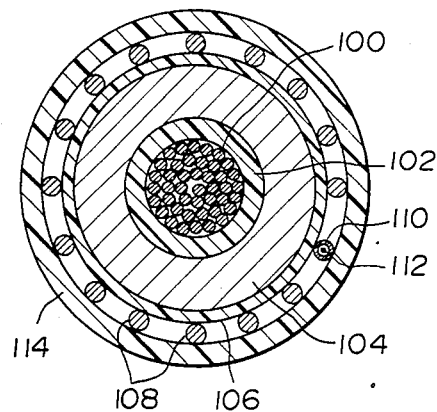
FIG. 1 is a cross-sectional view of a conventional composite power cable.
Figure 3:
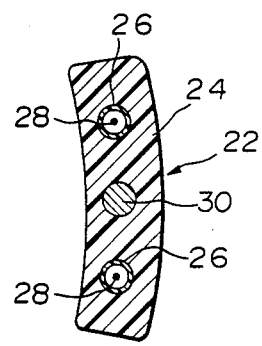
FIG. 3 is an enlarged cross-sectional view of an optical fiber unit of the cable of FIG. 2.
Figure 2:
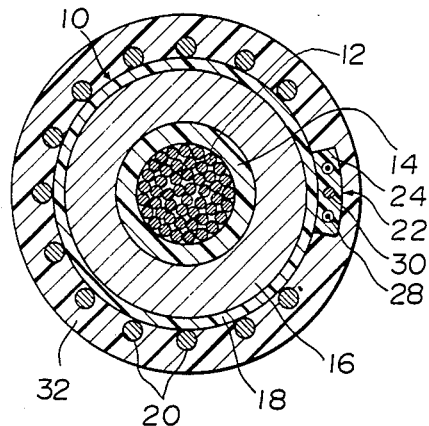
FIG. 2 is a cross-sectional view of a composite power cable in accordance with the present invention.

Referring to FIGS. 2 and 3, there is illustrated a composite power cable in accordance with one embodiment of the present invention. The power cable includes an elongated flexible cable core 10 of a circular cross-section. The cable core 10 includes an electrical conductor 12 consisting of stranded wires of such metal as copper and aluminum, an inner layer 14 of a semiconductive material encompassing the conductor 12, an insulation layer 16 of such a material as ethylene propylene rubber and crosslinked polyethylene encompassing the inner layer 14 and an outer layer 18 of a semiconductive material encompassing the insulation layer 16. The conductor 12 may be a single thread of wire. The semiconductive material of which the inner and outer layers 14 and 18 are made comprises for example polyethylene having carbon particles therein. A plurality of concentric neutral wires 20 consisting of solid coated copper wires are helically wound around the outer semiconductive layer 18 in circumferentially spaced relation to each other, and an elongated flexible optical fiber unit 22 also is helically wound around the outer semiconductive layer 18 so as to extend along the wires 20. The fiber unit 22 comprises an elongated flat body 24 of such a thermoplastic resin as nylon, polyethylene, polyvinyl chloride and neoprene, a pair of flexible tubes 26 embedded in the body 24 to extend longitudinally thereof in juxtaposed relation, a pair of optical fibers 28 loosely received in the tubes 26, respectively, and an elongated tension member 30 embedded in the body 24 and disposed between the pair of the tubes 26 so as to extend longitudinally of the body 24. The body 24 is applied around the cable core 10 with one side thereof being held in contact with the outer peripheral surface of the outer semiconductive layer 18, and the thickness of the body 24 between the one side thereof and the other side thereof is generally equal to a diameter of each of the wound wires 20. Each flexible tube 26 is made of a thermoplastic resin such as nylon, which may be the same as that of the body or may be different from it. The tension member 30 is for example constituted by a piano wire. And, the cable core 10 is encompassed by an outer sheath 32 of a thermoplastic resin such as polyethylene, nylon, polyvinyl chloride and neoprene so that the wires 20 and the optical fiber unit 22 are embedded therein. The thermoplastic resin of the outer sheath 32 and the thermoplastic resin of the body 24 of the fiber unit 22 are different from each other so as to have non-adhesive property to each other, thereby permitting the outer sheath 32 to be easily peeled or split from the optical fiber unit 22. The color of the resin of the outer sheath 32 may be black, and the color of the body 24 may be red or yellow so as to be distinguishable from black, thereby permitting the fiber unit 22 to be easily distinguished from the outer sheath 32 at the sight of the cross section thereof.

When the composite power cable is to be installed, the cable is usually subjected to a great pulling force. However, since the optical fiber unit 22 has sufficient flexibility and is helically wound around the cable core 10, the optical fiber unit 22 is prevented from being subjected to undue force during the installation of the cable. In addition, the optical fiber 28 being loosely received in the flexible tube 26 embedded in the flexible body 24 of the optical fiber unit 22, the optical fiber 28 is not subjected to any damage even if the installed cable is subjected to pulling force, or to expansion and contraction due to temperature variations. Further, the body 24 of the optical fiber unit 22 is made of the thermoplastic resin having non-adhesive property with respect to the thermoplastic resin of the outer sheath 32, and the optical fiber unit 22 is simply wound around the outer semiconductive layer 18 of the core 10. Accordingly, it is easy to split the outer sheath 32 from the optical fiber unit 22 and to separate the optical fiber unit 22 from the core 10 when terminating the end of the cable to connect it to a device or the like. In case that the colors of the body 24 of the fiber unit 24 and the outer sheath 32 are made different from each other, the fiber unit 24 can be easily found and peeled. Further, since the fiber unit 22 includes the tension member 30 provided therein, the fiber unit by itself has sufficient strength against tension exerted thereon, so that the peeled fiber unit 22 by itself can serve as a permanent wire.

For producing the composite power cable, the core 10 and the fiber unit 22 first are prepared. For preparing the fiber unit 22, a thermoplastic resin is extruded onto an optical fiber to provide the tube 26 having the fiber loosely received therein. Then, two tubes 26 are disposed in juxtaposed relation, and the tension member 30 is disposed so as to extend along the tubes 26 therebetween. Subsequently, a thermoplastic resin is extruded onto the tubes 26 and the tension member 30 to form the optical fiber unit 22. Subsequently, the optical fiber unit 22 and a plurality of wires 20 are helically wound around the core 10, and a thermoplastic resin different from the resin of the fiber unit 22 is extruded onto the core 10 to provide the outer sheath 32 in which the wires 20 and the fiber unit 22 are embedded. According to the process described above, the optical fiber unit 22 having a sufficiently small thickness generally equal to the diameter of the wires 20 can be easily produced without increasing the diameter of the cable unduly.

While the composite power cable according to the present invention has been specifically shown and described herein, the invention itself is not to be restricted by the exact showing of the drawings or the description thereof. For example, a plurality of optical fiber units may be wound around the cable core 10, and the optical fiber unit may be such that it includes more than two tubes or a plurality of tension members. Further, although in the illustrated embodiment, one optical fiber is received in each tube, a plurality of optical fibers may be received therein. Further, the thickness of the fiber unit 22 may be smaller than the diameter of the wire 20.

What is claimed is:

1. A composite power cable comprising:
   (a) an elongated cable core having an electrical conductor extending longitudinally along the length thereof and a shield layer of a semiconductive material provided around said conductor;
   (b) an outer sheath of polyethylene encompassing said cable core;
   (c) a plurality of concentric neutral wires embedded in said outer sheath and helically wound around said cable core; and
   (d) at least one elongated flexible optical fiber unit embedded in said outer sheath and wound around said cable core so as to extend along said neutral wires, said optical fiber unit comprising an elongated body of polyvinyl chloride extending longitudinally along the length thereof, at least one flexible tube of nylon embedded in said body to extend longitudinally along the length of said body, at least one optical fiber loosely received in said tube to extend longitudinally along the length of said tube and at least one elongated tension member embedded in said body to extend longitudinally along the length of said body, said outer sheath and said optical fiber unit having colors different from each other so as to be distinguishable from each other as viewed in cross-section, said body of said optical fiber unit being flat and having one side held in contact with an outer peripheral surface of said cable core, a thickness of said body between said one side thereof and the other side thereof being not greater than a diameter of said neutral wires.

* * * * *